United States Patent [19]

Haruna et al.

[11] Patent Number: 4,985,052
[45] Date of Patent: Jan. 15, 1991

[54] PROCESS FOR PRODUCING HIGH PURITY OXYGEN GAS FROM AIR

[75] Inventors: Kazuo Haruna, Kakogawa; Kanji Ueda, Ashiya; Masahiro Inoue, Hyogo; Hitosi Someda, Kakogawa, all of Japan

[73] Assignees: Seitetsu Kagaku Co., Ltd., Hyogo, Japan; Bergwerksverband GmbH, Essen, Fed. Rep. of Germany

[21] Appl. No.: 220,247

[22] Filed: Jul. 18, 1988

[30] Foreign Application Priority Data

Aug. 7, 1987 [JP] Japan ................... 62-198870

[51] Int. Cl.$^5$ .......................... B01D 53/04
[52] U.S. Cl. ........................ 55/26; 55/31; 55/33; 55/58; 55/62; 55/68; 55/75
[58] Field of Search ............ 55/25, 26, 31, 33, 58, 55/62, 68, 74, 75

[56] References Cited

U.S. PATENT DOCUMENTS

| | | | |
|---|---|---|---|
| 3,923,477 | 12/1975 | Armond et al. | 55/25 |
| 4,190,424 | 2/1980 | Armond et al. | 55/58 |
| 4,222,750 | 9/1980 | Gauthier et al. | 55/58 |
| 4,326,858 | 4/1982 | Benkmann | 55/26 |
| 4,386,945 | 6/1983 | Gardner | 55/26 |
| 4,482,361 | 11/1984 | Whysall | 55/26 |
| 4,512,778 | 4/1985 | Simonet et al. | 55/26 |
| 4,512,780 | 4/1985 | Fuderer | 55/26 |
| 4,519,813 | 5/1985 | Hagiwara et al. | 55/26 |
| 4,529,412 | 7/1985 | Hayashi et al. | 55/58 X |
| 4,566,881 | 1/1986 | Richter et al. | 55/58 X |
| 4,661,125 | 4/1987 | Haruna et al. | 55/26 |
| 4,684,377 | 8/1987 | Haruna et al. | 55/26 |
| 4,711,645 | 12/1987 | Kumar | 55/26 |
| 4,715,867 | 12/1987 | Vo | 55/26 |
| 4,737,167 | 4/1988 | Ohtani et al. | 55/26 |
| 4,744,803 | 5/1988 | Knaebel | 55/25 |
| 4,756,723 | 7/1988 | Sircar | 55/25 |
| 4,775,394 | 10/1988 | Yamano et al. | 55/26 |
| 4,781,735 | 11/1988 | Tagawa et al. | 55/26 |

FOREIGN PATENT DOCUMENTS 0176393  4/1986  European Pat. Off. .......... 55/26

Primary Examiner—Robert Spitzer
Attorney, Agent, or Firm—Jones, Tullar & Cooper

[57] ABSTRACT

A process for producing a high purity oxygen from air by PSA which comprises connecting a first adsorption unit packed with carbon molecular sieve and a second adsorption unit packed with zeolite molecular sieve in series, conducting PSA operation separately in each of the units during the same operation cycle time, accumulating the desorption gas from the first adsorption unit in a receiver and then introducing the resulting desorption gas to the second unit as a raw material gas and to the first unit as a rinse gas.

2 Claims, 6 Drawing Sheets

STEP-1
2 sec.

STEP-2
15 sec.

STEP-3
15 sec.

STEP-1
2 sec.

STEP-2
15 sec.

STEP-3
15 sec.

STEP-4
20 sec.

STEP-5
3 sec.

PROCESS FOR PRODUCING HIGH PURITY OXYGEN GAS FROM AIR

FIELD OF THE INVENTION

The present invention relates to a process for producing a high purity oxygen gas from air as a raw material by means of Pressure Swing Adsorption method (hereinafter referred to as PSA).

BACKGROUND OF THE INVENTION

At present, high purity oxygen gases such as those having high purities of 99.5% or more are greatly demanded industrially as a welding gas or for medical use such as oxygen inhalation. For these purposes, oxygen gases having high purity of 99.5% or more obtained from cryogenic plants of air liquefaction are used exclusively.

The process for producing a high purity oxygen gas from air by using a cryogenic plant is a technique conventionally carried out on an industrial scale, and various improvements thereof have been also made. However, its economical efficiency is established only by the large scale production of several tens of tons per day or more, which can be accomplished only by consumption on a large scale. Accordingly, when a small amount of oxygen is used, the above high purity oxygen gas obtained from a cryogenic plant is transported in the form of liquid by using a tank lorry or packed in gas cylinders to supply it dividedly, although the costs thereof become extremely high.

On the other hand, processes for producing oxygen by PSA have been also developed.

For example, U.S. Pat. No. 4,190,424 discloses a process for producing oxygen by PSA using a carbon molecular sieve adsorption section and a zeolite molecular sieve adsorption section. However, in this process, a gas desorbed from the carbon molecular sieve adsorption section during a middle stage of desorption is used as a raw material gas of the zeolite molecular sieve adsorption section. Thus, the recovery of oxygen is limited because a large amount of oxygen is generated during an initial stage of desorption. Further, no pressure equalization between an adsorber wherein adsorption has been completed and an adsorber wherein desorption has been completed in the same section is effected in this process and therefore it is difficult to recover a gas having a high oxygen content from the carbon molecular sieve adsorption section from the beginning of the desorption operation. Furthermore, no rinsing of the zeolite molecular sieve adsorption section from its outlet which improves separation efficiency of $N_2$ and $O_2$ is effected in this process. On the other hand, a pretreatment for removing water and carbon dioxide is preferably employed in this process and therefore the cost of operation and equipment become high.

Japanese Patent Kokai No. 60-200805 corresponding to U.S. Pat. No. 4,566,881 discloses a process characterized by carrying out the regeneration of a first adsorption unit and a second adsorption unit alternately with the same vacuum pump. Thereby, in the second adsorption unit, the operation time is wasted and the regeneration time is deficient. Thus, the operation time in one cycle required for the second adsorption unit becomes twice that of the first adsorption unit. Therefore, the size of the second adsorption unit in comparison with that required for the same operation time in one cycle is twice as great, which results in higher equipment costs of equipment. Further, loss of pressure energy becomes larger because the total process system is composed of a pressure adsorption (several bar) step by a compressor and a vacuum regeneration step by a vacuum pump, and pressure recovery is not effected after pressure adsorption. For example, according to Example 1 thereof, the adsorption pressure of the first adsorption unit is raised to 7 kg/cm²G (8 bar) by the compressor and therefore about 79% of $N_2$ contained in air is also compressed simultaneously, which makes the process wasteful from the viewpoint of power saving. Further, a drying unit for pretreatment to remove water included in the air is provided in the system. Therefore, not only the costs of plant and equipment increase but also the operation steps become much more complicated.

The waste of time and larger power consumption lose are disadvantages of PSA for producing a high purity oxygen gas at a low cost.

OBJECTS OF THE INVENTION

The present provides a process for producing an oxygen gas having a higher purity with lower power consumption and higher oxygen yield. As a result, it has been found that a high purity oxygen gas can be obtained with lower power consumption and lower construction cost, which has not been experienced, by connecting a first adsorption unit packed with carbon molecular sieve and a second adsorption unit packed with zeolite molecular sieve in series, conducting a PSA operation separately in each of the units during the same operation cycle time, accumulating the desorption gas which is obtained through the earlier part of the total desorption gas from the first unit in a receiver and then introducing the resulting desorption gas into the second unit as a raw material gas and also into the first unit as a rinse gas. Particularly, it has been found that, when the amount of the adsorbents and the adsorption and desorption pressures are set at optimum conditions, it is most preferable to conduct the operations of the first and the second adsorption units during the same operation cycle time in view of efficiency.

That is, the main object of the present invention is to provide a process for producing a high purity oxygen gas by PSA with lower power consumption, higher oxygen yield and a lower construction cost.

This object as well as other objects and advantages of the present invention will become apparent to those skilled in the art from the following description with reference to the accompanying drawings.

SUMMARY OF THE INVENTION

Figure 1:
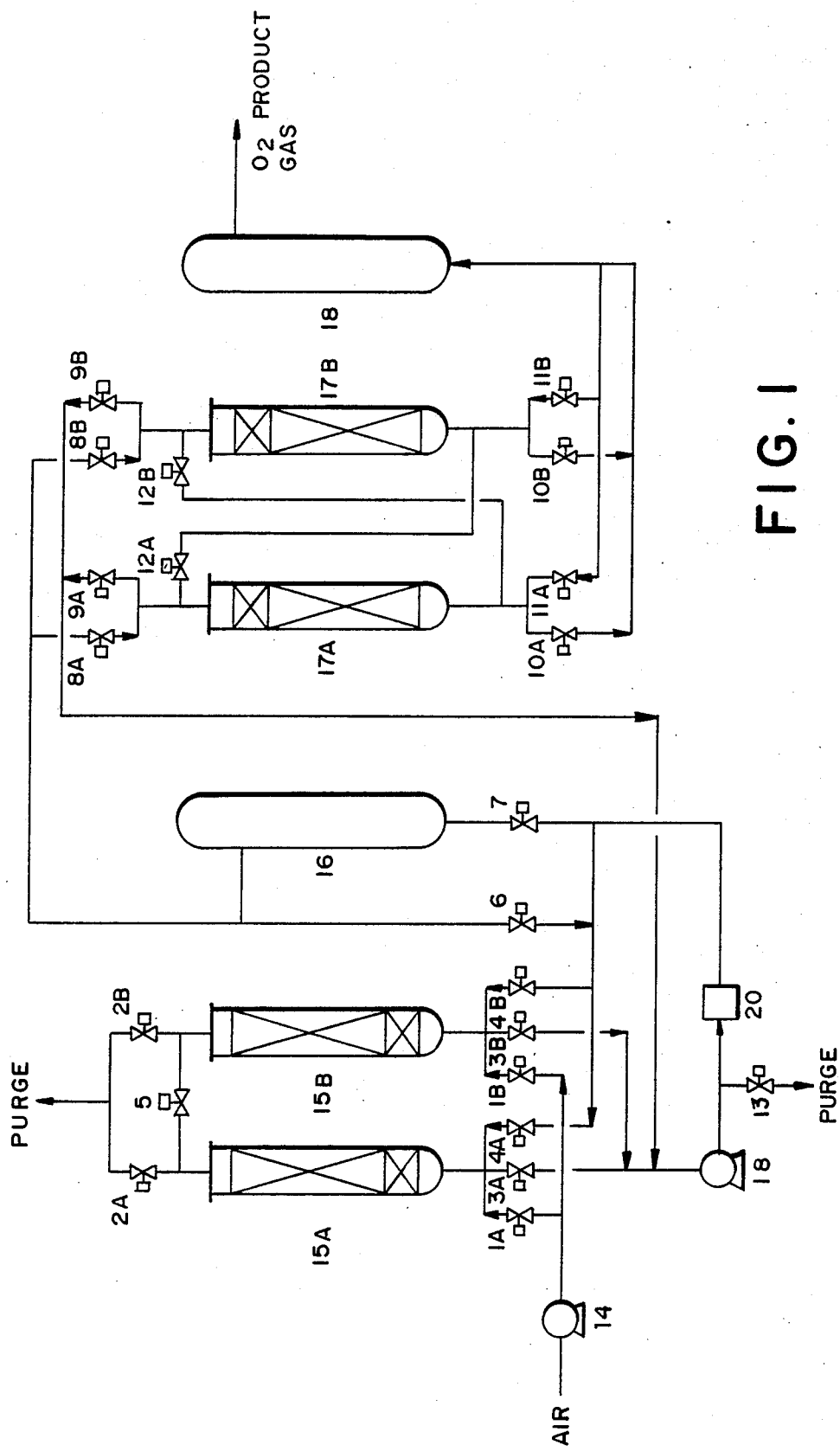
FIG. 1 is a flow diagram illustrating a preferred example of an apparatus used in the process of the present invention.

The present invention results from the improvements made by focusing on the following points.

(1) In order to obtain a high purity oxygen gas with lower power consumption, a pressure equalization step is arranged in each of the PSA operations of the first and second units and each unit is desorbed during the same operation cycle time by a vacuum pump. In this case, two vacuum pumps may be provided independently for the first and second units.

(2) In order to obtain a high oxygen content, a receiver is provided at the outlet of the vacuum pump and only a gas which is desorbed through the initial stage from the first unit and has a high oxygen content is accumulated for use as a raw material gas of the second unit. Further, the first unit is rinsed with the same gas in the direction parallel to the air flow.

(3) Both carbon molecular sieve and zeolite molecular sieve are degraded in properties if a raw material gas contains water. Therefore, a dehydrant, activated alumina, is packed at the gas inlet in each of the adsorbers, and the water adsorbed thereto during adsorption operation is condensed and removed by cooling during desorption operation by means of a refrigerator-type drier provided at the outlet of the vacuum pump of the first unit.

(4) Both carbon molecular sieve and zeolite molecular sieve adsorb carbon dioxide strongly and some of the carbon dioxide is admixed into the desorbed gas upon desorption. However, carbon dioxide can not be removed by the above refrigerator-type drier and, therefore, the carbon dioxide is accumulated within the system, when the PSA operation is continued for a long period of time. Then, it is partially purged from the outlet of the vacuum pump of the first or second unit to the outside of the system periodically.

Thus, according to the present invention, there is provided a process for producing a high purity oxygen from air by PSA which comprises connecting a first adsorption unit packed with carbon molecular sieve and a second adsorption unit packed with zeolite molecular sieve in series, conducting PSA operation separately in each of the units during the same operation cycle time, accumulating the desorption gas from the first adsorption unit in a receiver and then introducing the resulting desorption gas to the second unit as a raw material gas and to the first unit as a rinse gas.

Optionally, the process of the present invention can be carried out more effectively in combination with one or more of the following operations.

A dehydrant is packed in the gas inlet of each adsorber of the first and second unit to adsorb water, and water is desorbed therefrom under reduced pressure by a vacuum pump and condensed by cooling with a refrigerator-type drier provided at the outlet of the vacuum pump to remove water.

The first adsorption unit packed with carbon molecular sieve is composed of two adsorbers and pressure equalization is effected by connecting the adsorber wherein adsorption has been completed to the other adsorber wherein desorption has been completed at the outlet thereof, the second adsorption unit packed with zeolite molecular sieve is composed of two adsorbers and pressure equalization is effected by connecting the outlet of the adsorber wherein adsorption has been completed to the inlet of the other adsorber wherein desorption has been completed, and, at the same time, a part of the oxygen product gas is returned to the above second unit adsorber wherein desorption has been completed.

Carbon dioxide accumulated in the system is periodically exhausted in the atmosphere through the outlet of the vacuum pump used.

PREFERRED EMBODIMENTS OF THE INVENTION

Hereinafter, the preferred embodiments of the present invention are explained in detail with reference to the accompanying drawings.

In FIGS. 3a to 3e and 4a to 4e, the operation steps are conducted according to the bold lines shown. The time required for one cycle is not limited to those shown in the drawings. However, a cycle time in the range of 50 sec. x 2/cycle to 120 sec. x 2/cycle is preferred.

Each operation step is explained with reference to FIGS. 1 and 3a to 3e.

Step-1 Air raised in pressure up to several hundreds mm water column gauge by an air blower 14 in a first adsorption unit is introduced into an adsorber 15A, which is packed with activated alumina at the gas inlet thereof and carbon molecular sieve thereabove, through a switch valve (hereinafter referred to as "V-") 1A and pressurized. On the other hand, oxygen adsorbed to an adsorber 15B is desorbed at any pressure in the process reducing pressure to about 50 to 200 torr by a vacuum pump 19 and then the desorbed oxygen is accumulated through the valve 7 into a receiver 16. At this moment, a gas having a highest oxygen content (about 70% or more) can be obtained.

In a second adsorption unit, a high oxygen content gas remaining in adsorber 17B is recovered from the outlet of the adsorber 17B wherein adsorption has been completed to the inlet of an adsorber 17A wherein desorption has been completed through V-12A by pressure equalization, each adsorber being packed with activated alumina at the gas inlet thereof and zeolite molecular sieve at the lower part thereof. At the same time, an oxygen product gas is allowed to flow backward from a product tank 18 to the adsorber 17A through V-10A.

Step-2 In the first adsorption unit, oxygen is adsorbed preferentially from air which is introduced into the adsorber 15A, and the residual gas is enriched with argon gas and nitrogen gas and released in the atmosphere through V-2A.

On the other hand, the adsorber 15B continuously desorbs 70% or more oxygen content gas in the process reducing pressure to 50–200 torr by a vacuum pump 19.

In the second adsorption unit, an oxygen gas having an oxygen content of about 70% is introduced into the adsorber 17A from the receiver 16 through V-8A and, at the same time, the oxygen product gas having a high purity flows backward from the product tank 18 to the adsorber 17A to increase in pressure. On the other hand, the adsorber 17B is desorbed and regenerated through V-9B by a vacuum pump 19. The desorption gas is mixed with the gas desorbed from the adsorber 15B of the first unit through V-3B and the water contained therein is removed by condensation with a refrigerator-type drier 20. Thereby, substantially all water contained in the air used as the raw material gas in an amount of about 0.5 to 5 vol % is removed.

Step-3 In order to enrich the content of oxygen adsorbed in the first adsorption unit, a gas having an oxygen content of about 70% or less which is the remainder of the desorption gas from the adsorber 15B through V-3B is introduced into the adsorber 15A through V-4A to rinse the adsorber. During this step, in the second adsorption unit nitrogen contained in the raw material gas is adsorbed by adsorber 17A to produce an oxygen product gas having a purity of 99.5% or more and the oxygen product gas is accumulated in the product tank 18. On the other hand, desorption is effected in the adsorber 17B.

Step-4 In order to further enrich the content of oxygen adsorbed in the first adsorption unit, the gas having an oxygen content of about 70% or more accumulated in the receiver 16 is admixed with the above desorption gas from the adsorber 15B and the resulting gas is introduced into the adsorber 15A through the valves 6 and V-4A for rinsing. During this step, in the second adsorption unit, adsorption and desorption are carried out while the adsorber 17B is rinsed by flowing a part of the oxygen product gas having a high oxygen content backward from the product tank 18 through V-11B.

Step-5 In the first adsorption unit, the oxygen enriched residual gas in the adsorber 15A is recovered from the outlet of the adsorber 15A wherein oxygen has been adsorbed sufficiently to the adsorber 15B wherein desorption have been completed through V-5 by pressure equalization. It is possible to create conditions under which high oxygen contents can be readily obtained by transferring residual gas in the void space of an adsorber, which contains a small amount of nitrogen gas, partially to another adsorber On the other hand, nitrogen and carbon dioxide adsorbed to the adsorber 17B in the second unit are released in the atmosphere through a purge valve V-13 provided at the outlet of the vacuum pump 19 by expelling it with the rinse gas, i.e., the high purity oxygen product gas from the product tank 18.

Another preferred embodiment of the operation steps is explained with reference to FIGS. 2 and 4a to 4e.

Step-1 Air raised in pressure up to several mm water column gauge by an air blower 14 in a first adsorption unit is introduced into an adsorber 15A, which is packed with activated alumina at the gas inlet thereof and carbon molecular sieve thereabove, through a switch valve V-1A and pressurized. On the other hand, oxygen adsorbed to an adsorber 15B is desorbed at any pressure in the process reducing pressure to about 50 to 200 torr by a vacuum pump 19A and the desorbed oxygen is accumulated through the valve 7 into the receiver 16. At this moment, a gas having a highest oxygen content (about 70% or more) can be obtained.

In a second adsorption unit, a high oxygen content gas remaining in adsorber 17B is recovered from the outlet of the adsorber 17B wherein adsorption has been completed to the inlet of the adsorber 17A wherein desorption has been completed through V-12A by pressure equalization, each adsorber being packed with activated alumina at the gas inlet thereof and zeolite molecular sieve at the lower part thereof and, at the same time, an oxygen product gas is allowed to flow backward from a product tank 18 to the adsorber 17A through V-10A.

Step-2 In the first unit, oxygen is adsorbed preferentially from air which is introduced into the adsorber 15A and the residual gas is enriched with argon gas and nitrogen gas and released in the atmosphere through V-2A.

On the other hand, the adsorber 15B continuously adsorbs 70% or more oxygen content gas in the process reducing pressure to 50-200 torr by a vacuum pump 19A.

In the second unit, an oxygen gas having an oxygen content of about 70% is introduced into the adsorber 17A from the receiver 16 through V-8A and, at the same time, the oxygen product gas having a high purity oxygen gas flows backward to the adsorber 17A from the product tank 18 to increase in pressure. On the other hand, the adsorber 17B is desorbed and regenerated through V-9B by a vacuum pump 19B and the desorption gas is released in the atmosphere through a valve 13. Water contained in the gas which is desorbed and regenerated from the adsorber 15B in the first unit by the vacuum pump 19A is removed by condensation with a refrigerator-type drier 20. Thereby, substantially all water contained in the air as a raw material gas in the amount of about 0.5 to 5 vol % is removed.

Step-3 In order to enrich the content of oxygen adsorbed in the first adsorption unit, a gas having an oxygen content of about 70% or less which is the remainder of the desorption gas from the adsorber 15B through V-3B is introduced into the adsorber 15A through V-4A. Thereby, the adsorber is rinsed. During this step, in the second adsorption unit, nitrogen contained in the raw material gas is removed by adsorption and the non-adsorbed gas having an oxygen content of 99.5% or more is accumulated in the product tank 18 as an oxygen product gas. On the other hand, desorption is effected in the adsorber 17B and the desorption gas is released in the atmosphere through the valve 13.

Step-4 In order to further enrich the content of oxygen adsorbed in the first adsorption unit, the gas having an oxygen content of about 70% or more accumulated in the receiver 16 is introduced into the adsorber 15A through the valves 6 and V-4A for rinsing. During this step, in the second adsorption unit, adsorption and desorption are carried out while the adsorber 17B is rinsed by flowing backward a part of the oxygen product gas from the product tank 18 through V-11B.

Step-5 In the first adsorption unit, the oxygen enriched residual gas backward in the adsorber 15A is recovered from the outlet of the adsorber 15A wherein oxygen has been adsorbed sufficiently to the adsorber 15B wherein desorption has been completed through V-5 by pressure equalization. It is possible to create the conditions under which high oxygen contents can be readily obtained by transferring residual gas in the void space of an adsorber, which contains a small amount of nitrogen gas, partially to another adsorber.

On the other hand, nitrogen and carbon dioxide adsorbed to the adsorber 17B in the second adsorption unit are released in the atmosphere through a purge valve V-13 provided at the outlet of the vacuum pump 19B by expelling it with a rinse gas, i.e., the oxygen product gas from the product tank 18.

In the process of the present invention, carbon molecular sieve and zeolite molecular sieve to be used are not specifically limited and known molecular sieves can be used.

According to the process of the present invention, oxygen gas having a purity of 99.5% or higher can be efficiently obtained with lower power consumption by simple adsorption units from air. Since the oxygen gas is obtained only by PSA operation, the costs of plant and equipment are very low.

The following Examples further illustrate the present invention in detail but are not to be construed to limit the scope thereof.

EXAMPLE 1

In the fist adsorption unit as shown in FIG. 1, commercially available activated alumina (60 kg) was packed in the gas inlet of each adsorber and then carbon molecular sieve having uniform micro pore diameters ranging from 3 to 4 Å manufactured by Bergbau Forshung, in West Germany (420 kg) was packed thereabove. In the second adsorption unit, commercially available activated alumina (15 kg) was packed in the gas inlet of each adsorber and calcium type zeolite molecular sieve having a micro pore diameter of 5 Å (45 kg) was packed at the bottom side thereof. The PSA operation of the present invention was effected at 55 sec × 2/cycle in accordance with the operation steps shown by FIGS. 3a to 3e by feeding air to the first and second units by the air blower so that the adsorption pressures of both unit became 0.05 kg/cm$^2$G, and controlling the inlet final desorption pressure of the vacuum pump to reach 100 torr. The results are as follows.

Composition of the waste gas at the outlet of the first adsorption unit (all "%'s" are by volume unless otherwise stated):

$O_2$ 13.0%, $N_2$ 86.0%, Ar 1.0%

Composition of the gas in the receiver:

$O_2$ 73.8%, $N_2$ 25.5%, Ar 0.2%, $CO_2$ 0.5%

Composition of the gas released from the outlet of the vacuum pump to the atmosphere:

$O_2$ 49.3%, $N_2$ 49.7%, Ar 0.2%, $CO_2$ 0.8%

Composition of oxygen product gas:

$O_2$ 99.7%, Ar 0.3%

Rate of oxygen product gas:

5.0 NM$^3$/H

Yield of oxygen product gas:

36%

EXAMPLE 2

Figure 2:
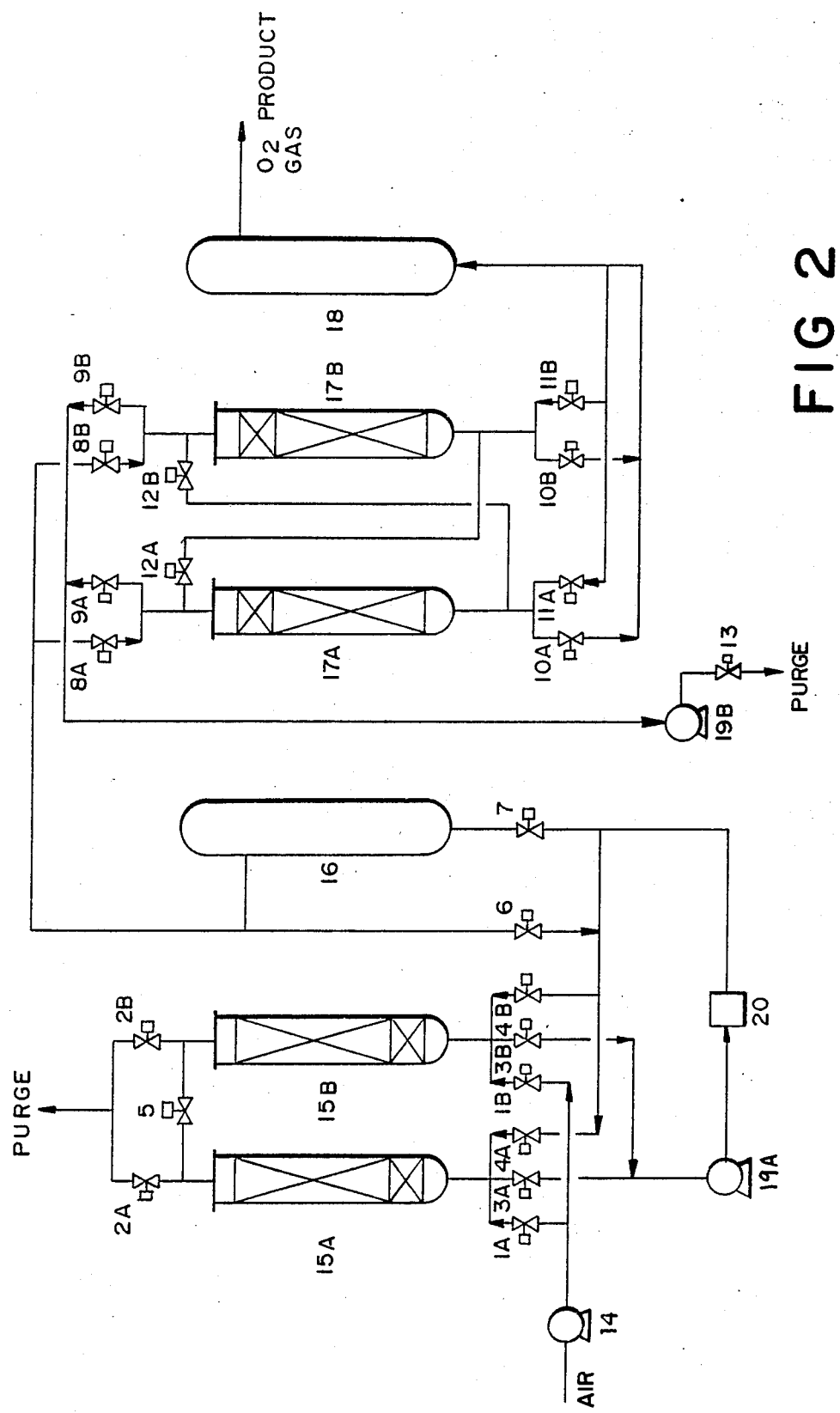
FIG. 2 is a flow diagram illustrating another preferred example of an apparatus used in the process of the present invention, wherein two vacuum pumps are provided.
Figure 3A:
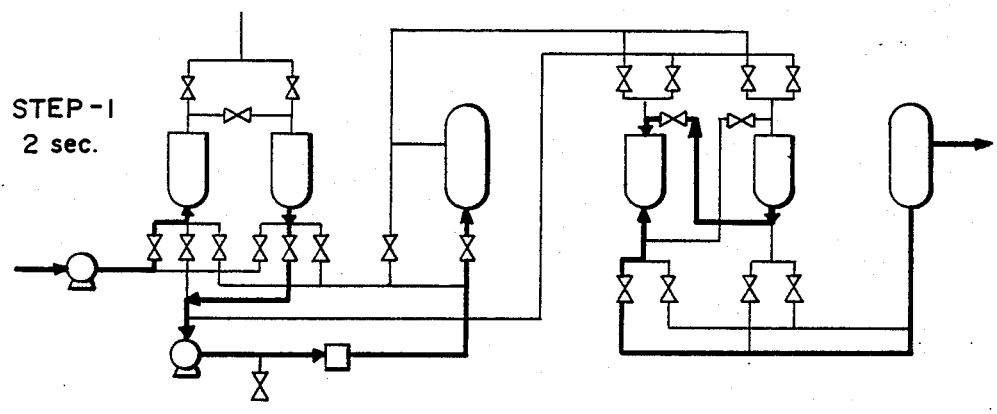
FIGS. 3a to 3e are flow diagrams illustrating one preferred embodiment of the process of the present invention, wherein the apparatus shown in FIG. 1 is used
Figure 3B:
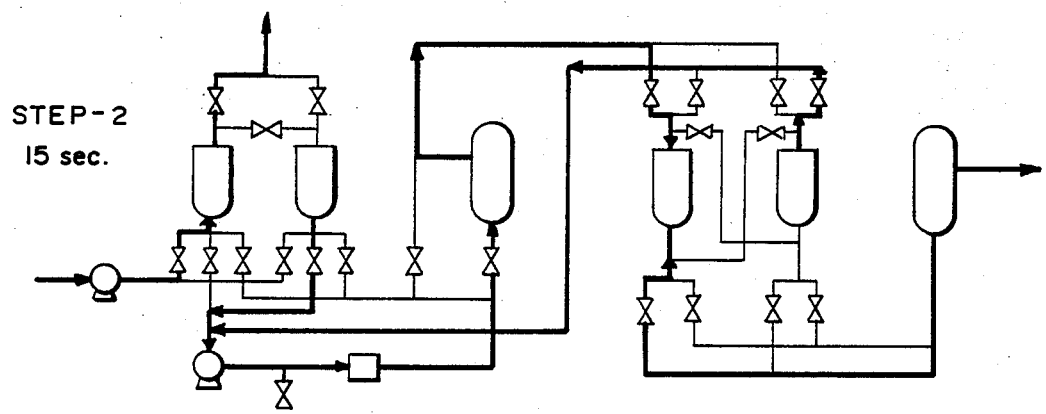
Figure 3C:
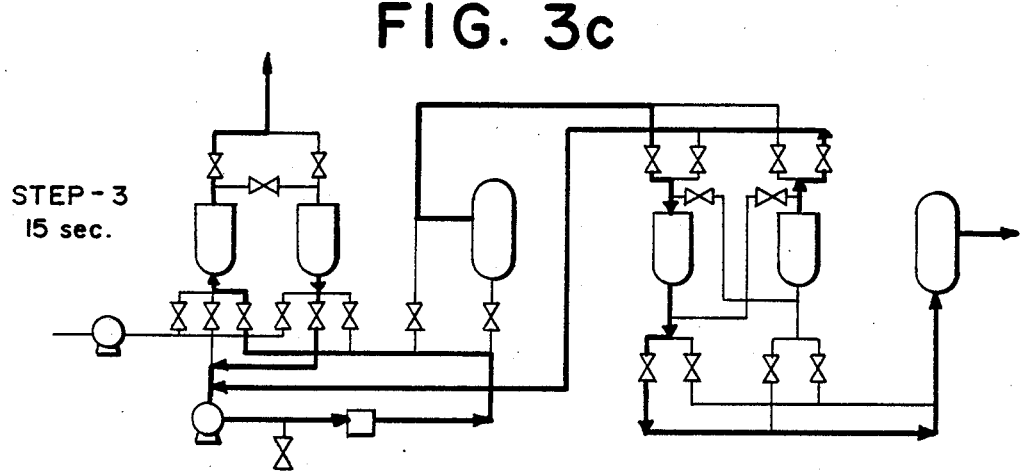
Figure 3D:
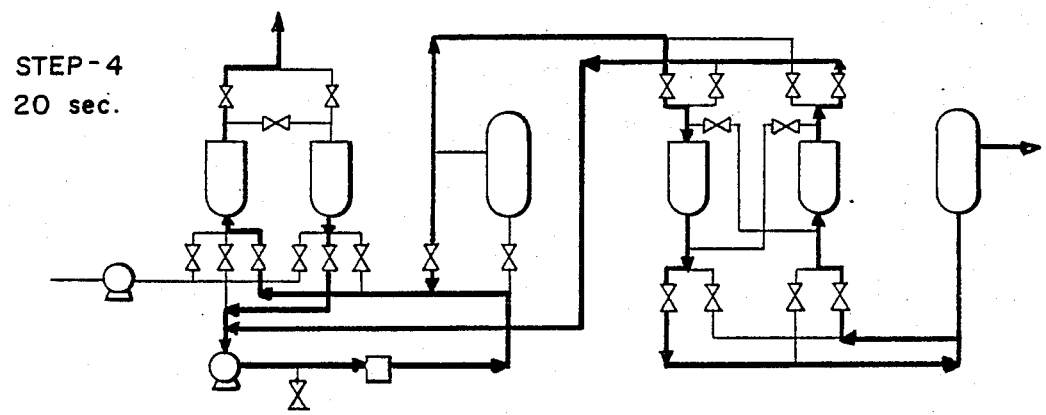
Figure 3E:
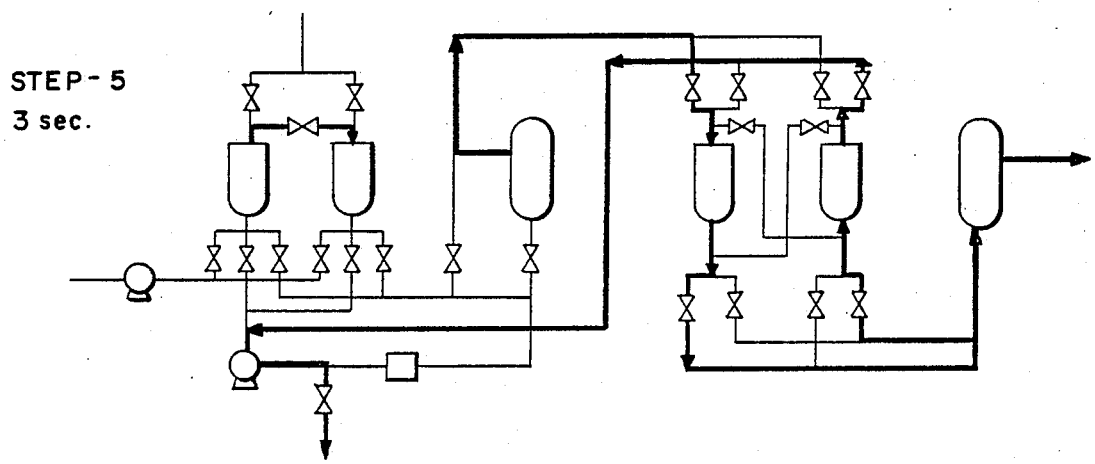
Figure 4A:
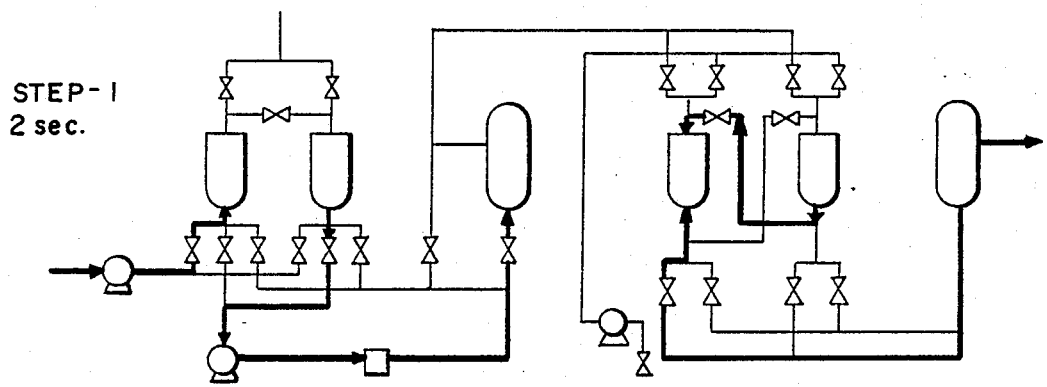
FIGS. 4a to 4e are flow diagrams illustrating another preferred embodiment of the process of the present invention, wherein the apparatus shown in FIG. 2 is used.
Figure 4B:
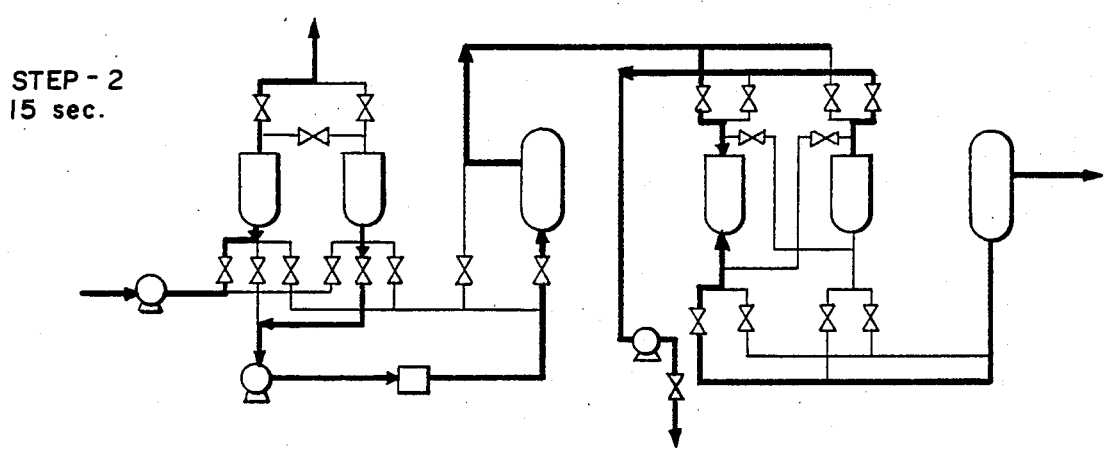
Figure 4C:
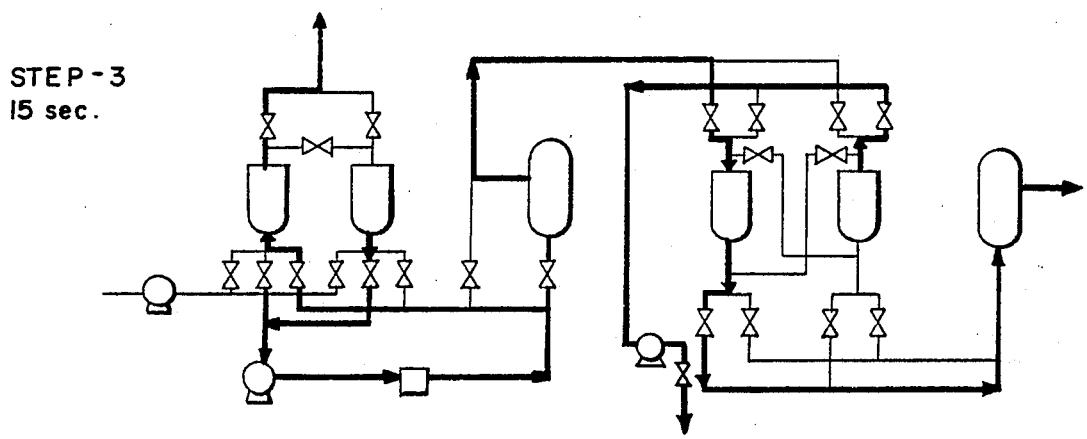
Figure 4D:
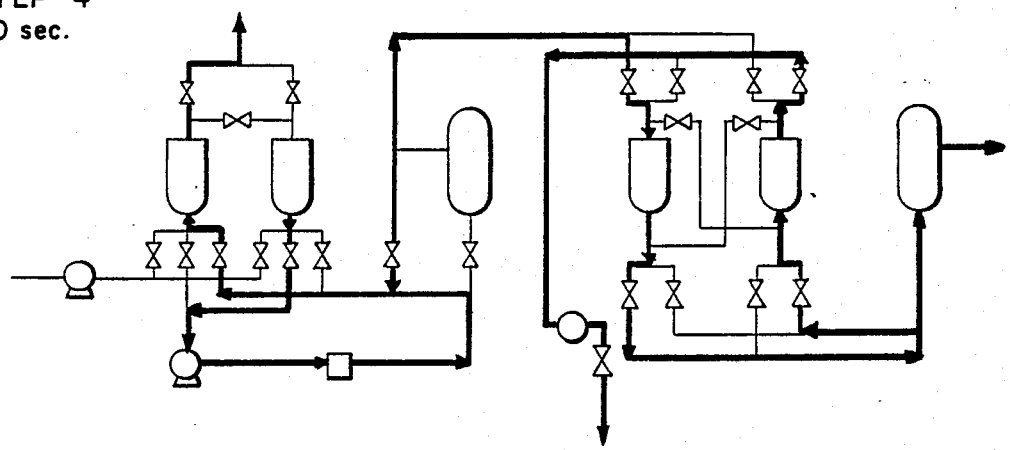
Figure 4E:
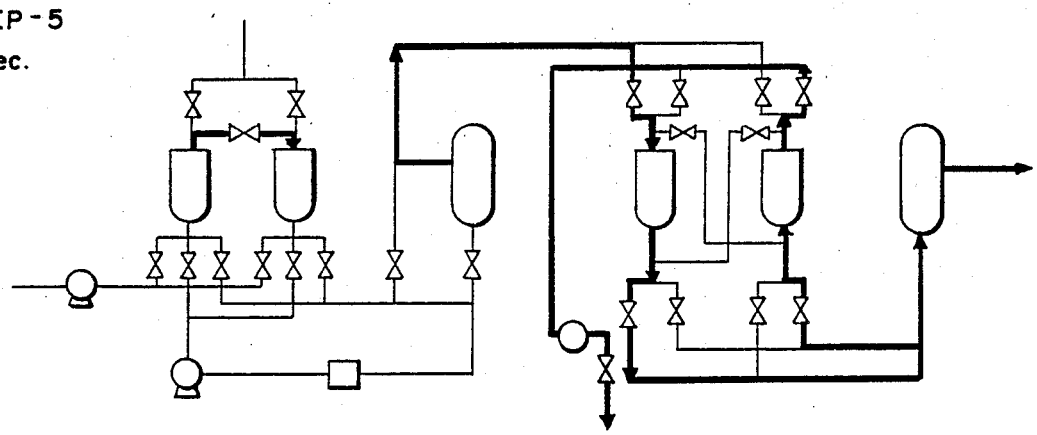

In the fist adsorption unit as shown in FIG. 2, commercially available activated alumina (60 kg) was packed in the gas inlet of each adsorber and then carbon molecular sieve having uniform micro pore diameters ranging from 3 to 4 Å manufactured by Bergbau Forshung, in West Germany (420 kg) was packed thereabove. In the second adsorption unit, commercially available activated alumina (15 kg) was packed in the gas inlet of each adsorber and calcium type zeolite molecular sieve having a micro pore diameter of 5 Å (45 kg) was packed at the bottom side thereof. The PSA operation of the present invention was effected at 55 sec × 2/cycle in accordance with the operation steps shown by FIGS. 4a to 4e by feeding air to the first and second units by the air blower so that the adsorption pressures of both unit became 0.05 kg/cm$^2$G, and controlling the inlet final desorption pressure of each of the vacuum pumps provided to respective units to reach 100 torr. The results are as follows.

Composition of the waste gas at the outlet of the first adsorption unit:

$O_2$ 12.5%, $N_2$ 86.3%, Ar 1.2%

Composition of the gas in the receiver:

$O_2$ 73.9%, $N_2$ 25.4%, Ar 0.2%, $CO_2$ 0.5%

Composition of the gas released from the outlet of the vacuum pump 19A to the atmosphere:

$O_2$ 49.5%, $N_2$ 49.5%, Ar 0.2%, $CO_2$ 0.8%

Composition of the gas released from the outlet of the vacuum pump 19B to the atmosphere:

$O_2$ 53.2%, $N_2$ 45.9%, Ar 0.2%, $CO_2$ 0.7% of oxygen product gas:

$O_2$ 99.7%, Ar 0.3%

Rate of oxygen product gas:

4.9 NM$^3$/H

Yield of oxygen product gas:

35%

What is claimed is:

1. A process for producing high purity oxygen from air by PSA, with an apparatus comprising: a first adsorption unit packed with carbon molecular sieve; a second adsorption unit packed with zeolite molecular sieve connected in series with the first adsorption unit, each of the units being composed of two adsorbers, and a dehydrant being further packed in the gas inlet of each adsorber; one gas receiver provided between the first and second units for accumulating a desorption gas from the first adsorption unit as well as for introducing the desorption gas to the second unit as a raw material gas and to the first unit as a rinse gas; and one vacuum pump and one refrigerator-type drier at the outlet of the vacuum pump to remove water for desorbing water from each unit, comprising the steps of:

conducting PSA operation separately in each of the units during the same operation cycle time, with effecting a pressure equalization in the first adsorption unit by connecting the adsorber wherein adsorption has been completed to the adsorber wherein desorption has been completed at the outlet thereof as well as effecting a pressure equalization in the second adsorption unit by connecting the outlet of the adsorber wherein adsorption has been completed to the inlet of the adsorber wherein desorption has been completed, and, at the same time, returning a part of the oxygen product gas to the above adsorber of the second adsorption unit wherein desorption has been completed;

accumulating the desorption gas from the first adsorption unit in the receiver and then introducing the resulting desorption gas to the second unit as a raw material gas and to the first unit as the rinse gas, the raw material gas of the second adsorption unit and the rinse gas being initially desorbed gas from the first adsorption unit having an oxygen content of at least 70%; and desorbing water from each unit under reduced pressure by the vacuum pump and condensed by cooling with the refrigerator-type drier.

2. The process according to claim 1, further comprising the step of:

periodically releasing carbon dioxide accumulated in the apparatus in the atmosphere through the outlet of the vacuum pump.

* * * * *